United States Patent [19]

Krieg

[11] 4,298,909
[45] Nov. 3, 1981

[54] PHOTOFLASH REFLECTOR CONFIGURATION

[75] Inventor: Rudolf Krieg, Munich, Fed. Rep. of Germany

[73] Assignee: Patent-Treuhand-Gesellschaft fur elektrische Gluhlampen mbH, Munich, Fed. Rep. of Germany

[21] Appl. No.: 48,039

[22] Filed: Jun. 13, 1979

[30] Foreign Application Priority Data

Jul. 10, 1978 [DE]  Fed. Rep. of Germany ....... 2830321

[51] Int. Cl.³ .............................................. G03B 15/02
[52] U.S. Cl. ......................................... 362/18; 362/16; 362/17; 362/346; 362/347; 362/117; 362/304; 362/283
[58] Field of Search ..................... 362/16, 17, 18, 346, 362/347, 117, 304, 283

[56] References Cited

U.S. PATENT DOCUMENTS

| | | | |
|---|---|---|---|
| 3,127,113 | 3/1964 | Tomkinson | 362/17 |
| 3,609,340 | 9/1971 | Habro | 362/346 |
| 4,194,234 | 3/1980 | Geissler | 362/346 |
| 4,200,902 | 4/1980 | Intrator | 362/346 |

*Primary Examiner*—Brooks H. Hunt
*Attorney, Agent, or Firm*—Frishauf, Holtz, Goodman & Woodward

[57] ABSTRACT

To optimize light output from a multiple reflector photoflashgun powered by a single elongated flashtube, the flashtube is positioned within a reflector having a curvature falling within the area defined by the curves A and B:

$A: y^2 = 13,4 \ x \ -0,3722 \ x^2$ with $0 < y < 12,3$ and
$B: y^2 = 18 \ \ \ x \ -0,5233 \ x^2$ with $0 < y < 11$

10 Claims, 6 Drawing Figures

4,298,909

PHOTOFLASH REFLECTOR CONFIGURATION

Reference to related application, assigned to the assignee of the present application:
U.S. Ser. No. 940,011, filed Sept. 6, 1978, GEISSLER, now U.S. Pat. No. 4,194,234.

The present invention relates to photoflash units, and more particularly to electronic flash units having a flashtube which is subjected to a discharge, particularly a capacitor discharge, and which is so constructed that the light from the discharge can be directed, as desired, in various directions so that, simultaneously and from one discharge, direct as well as indirect or "bounce" illumination can be obtained from a single photoflash unit.

BACKGROUND AND PRIOR ART

U.S. Patent Application Ser. No. 940,011, filed Sept. 6, 1978, GEISSLER, now U.S. Pat. No. 4,194,234, assigned to the assignee of the present application, discloses electronic photoflash guns having a holder for a single gas discharge lamp positioned therein, and reflectors positioned in the light path from the gas discharge lamp to reflect light therefrom, which are constructed as a plurality of reflector elements of which at least one is relatively movable with respect to the light source and to another reflector element in order to permit directing light from the light source in multiple directions, in accordance with the respective orientation of the reflector elements. The structure is so arranged that an elongated lighttube or flashtube has generally parabolic reflectors surrounding the flashtube, of which one reflector element at least is relatively movable with respect to another. It is thus possible to generate light beams which can be selectively pointed in desired directions without requiring any additional optical devices, such as reflector screens and the like, or optics which form attachments to the flashgun itself. The flashgun, when constructed as an electronic flashgun, is particularly versatile since it permits, from one single flash, to obtain direct and indirect illumination, or intense direct or intense indirect illumination, in accordance with the relative orientation of the respective reflector elements with respect to the subject to be photographed, or to surrounding structures such as the ceiling of a room or studio.

The efficiency of light output obtained from the very short but intense flash of the flashtube is highly dependent not only on the quality of the reflective surfaces but also on the respective positioning of the light source with respect to the reflecting surface itself.

THE INVENTION

It is an object to optimize the light output from electronic flash units of the above-described type, so that maximum light can be obtained while being beamed in selective directions from the single flashtube during discharge thereof.

Briefly, the reflector elements are generally parabolic and specifically have a contour which lies in an area between curves defined by the equations:

$$A: y^2 = 13{,}4 \times -0{,}3722\, x^2 \text{ with } 0 < y < 12{,}3 \text{ and}$$
$$B: y^2 = 18 \times -0{,}5233\, x^2 \text{ with } 0 < y < 11$$

Drawings, illustrating preferred examples, wherein.

Figure 1:
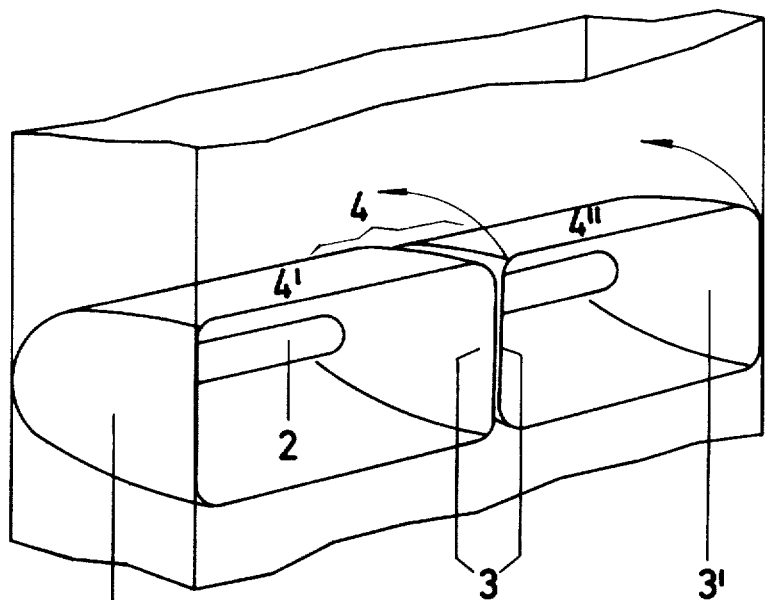
FIG. 1 is a fragmentary, highly schematic perspective structure of one form of the invention and showing the arrangement of a flashtube with two reflectors.
Figure 2:
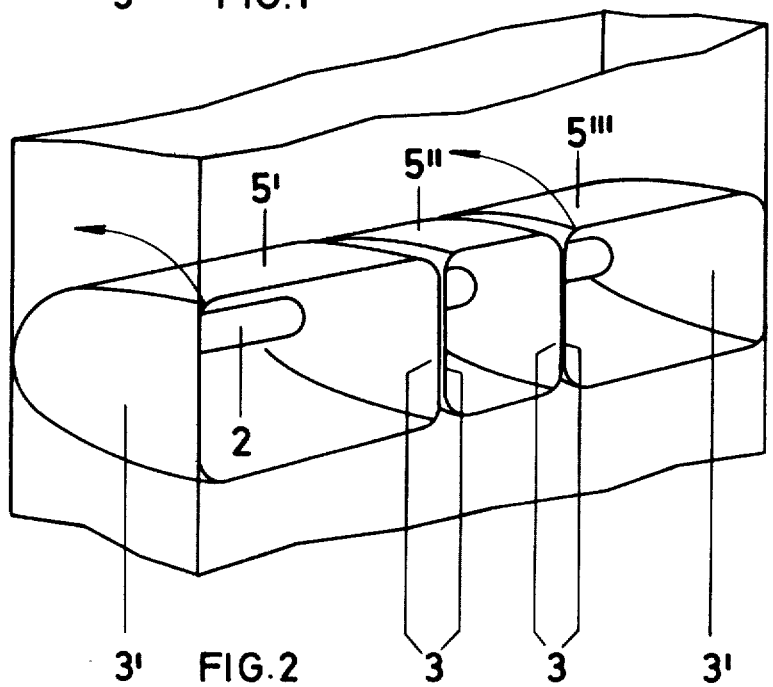
FIG. 2 shows an arrangement of one flashtube with three reflectors.
Figure 3:
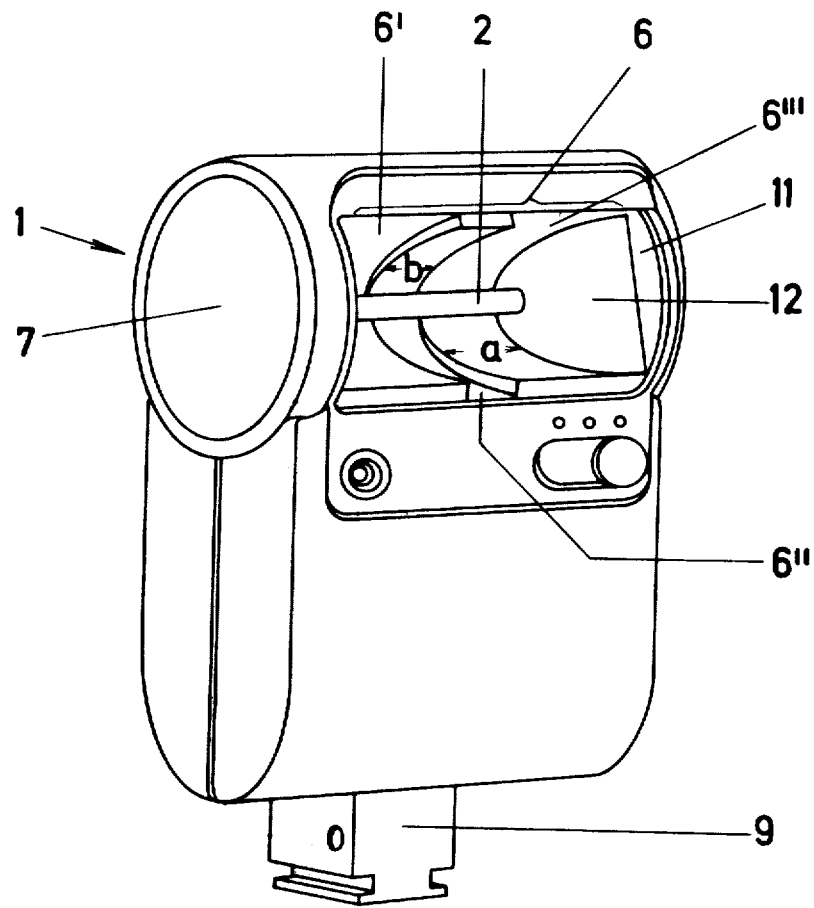
FIG. 3 is an electronic flash unit, in perspective view, and illustrating the arrangement of reflectors adjacent each other.

A tubular light source 2 (FIGS. 1, 2), which is part of an electronic flash unit of standard and suitable construction, is located within a reflector assembly 4. The reflector assembly 4 has two adjacently located reflector elements 4', 4" formed with separating walls 3 and having end walls 3'. FIG. 2 illustrates a similar arrangement in which, however, three reflectors 5', 5", 5''' are provided, the center reflector element 5" having two central walls. FIG. 3 illustrates a complete electronic flash unit which is a preferred form of the invention, having a reflector 6 formed of three reflector elements 6', 6", 6''' without, however, including inner separating walls 3. The reflector elements 6', 6", 6''' are stacked along the length of the light source 2. The outer reflector elements 6', 6''' have lateral side walls 12—of which only one is visible in the figure. The reflector 6' has a similar side wall, hidden behind the housing. The side walls 12 are inclined with respect to the axis of the tube 2 and are angled outwardly towards the opening from which light emanates. The two outer reflector elements 6', 6''' are rotatable about the light source 2. The reflector element 6" is fixed. A suitable rotating or tilting mechanism (not shown) is provided for the reflector 6', 6''', which can be conjointly or individually adjusted in their orientation with respect to the base 9 of the flash unit. It is thus possible to provide only direct illumination or simultaneously direct and indirect illumination for a photographic subject. In a preferred and suitable form of a flashgun for portable photographic use, the reflector 6 in the plane of the light exit opening can have, overall, a dimension of about 24×54 mm. The half angles of the lightbundle, in the horizontal, is $2\alpha = 65°$, and in the vertical $2\alpha = 50°$. The width b of the center reflector unit 6" is about 10 mm throughout. The width a of the reflector unit 6', 6''' at the sides increases from the apex of the reflector towards the light exit opening due to the inclination of the side walls 12. The width a of the reflector unit 6', 6''' at the apex is about 15 mm; in the plane of the light exit opening, the width of the respective reflector units is about 22 mm. The relationship of the width b of the reflector unit 6" to the sum of the widths a of the reflector unit 6', 6''' is about 1:3 at the apex of the reflector. The light source 2 has a useful illuminating length of about 40 mm which provides light for direct and reflected illumination; it permits light output and illumination of an object to be photographed both by direct illumination as well as by indirect or "bounce" flash, in which the indirect element may be about ¾ of the overall light output, depending on the respective orientation of the reflector units 6', 6''' with respect to the unit 6". The ratio of the width of the reflector unit 6" to the sum of the widths of the reflector unit 6', 6''' in the plane of the light exit opening is approximately 1:4.4.

Figure 4:
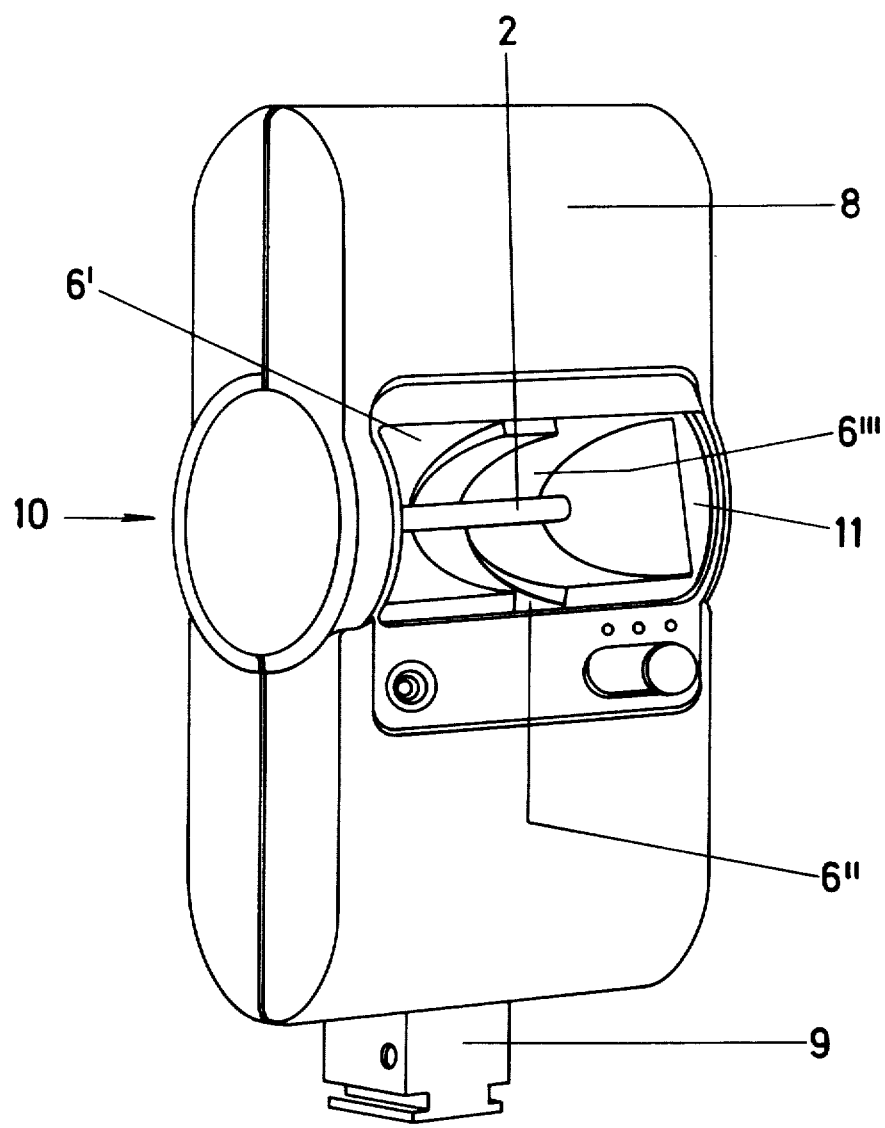
FIG. 4 is a perspective view of a complete electronic flash unit.
Figure 5:
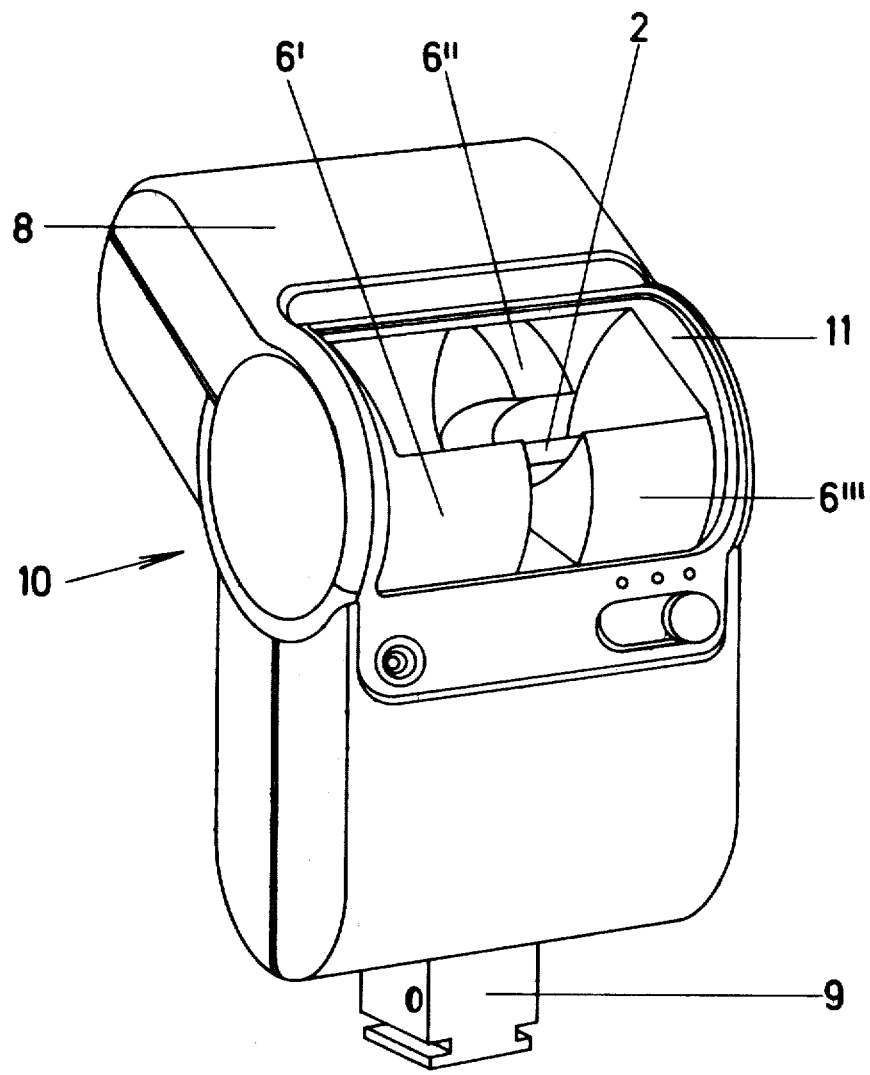
FIG. 5 is a view similar to FIG. 4 and showing the flash unit in another position.

FIGS. 4 and 5 illustrate suitable flashgun structures in which the reflector arrangement is similar, generally, to FIG. 3.

The adjustment of the respective reflector units 6',6''' with respect to the housing can be carried out by friction engagement with a rotatable, bulged or otherwise accessible disk 7, coupled for rotation with the respective reflector element. For ease of adjustment and operation, the color of the disk 7 preferably should differ from that of the remainder of the housing, for example the disks 7 can be colored red or green, for left or right operation, with the remainder of the housing being black.

FIGS. 4 and 5 illustrate two arrangements in which the outer reflectors 6', 6''' are ganged together, for conjoint operation as seen in FIG. 5. The housing portion 8 is coupled to the cylindrical portion 10 on which the reflectors 6', 6''' are secured. The base of the unit is formed by a standard camera flash connection shoe 9. A part-cylindrical, clear, transparent cover 11 closes off the reflectors and prevents contamination and dirt from interfering with reflection of light from tube 2.

Figure 6:
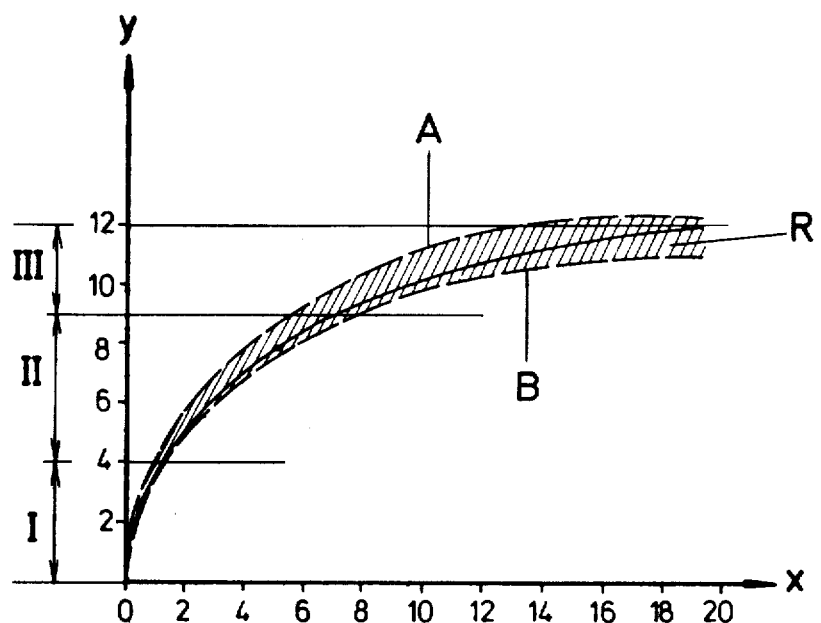
FIG. 6 is a graphic representation of the curves and the optimum reflector curve which form the mathematical basis for the present application.

For maximum light output, the tube and the reflector should be matched together. This is particularly important when reflectors are provided which direct light into different directions. In accordance with a feature of the invention, the curvature of the reflection surface of reflectors 4, 5, 6 is within a narrow range bounded by two curves A, B, as set forth graphically in FIG. 6, and mathematically defined as $$A: y^2 = 13,4 \times -0,3722\, x^2 \text{ with } 0 < y < 12,3 \text{ and}$$
$$B: y^2 = 18 \times -0,5233\, x^2 \text{ with } 0 < y < 11$$

The area between the curves is hatched and shown at R. The optimum curve, shown in solid lines within the area R, is located within that area. Preferably, the curve is composed of three curve sections or elements which merge smoothly into each other. The curve sections or elements and the respective mathematical definitions of the curves are set forth as follows:

| Curve Section | Range | Equation |
| --- | --- | --- |
| I | $0 < y < 4$ | $y^2 = 15.4 \times -0.0675\, x^2$ |
| II | $4 < y < 9$ | $y^2 = 14.6 \times -0.4148\, x^2$ |
| III | $9 < y < 12.06$ | $y^2 = 12.6 \times -0.2681\, x^2$ |

Various changes and modifications may be made, and features described in connection with any one of the embodiments may be used with any one of the others within the scope of the inventive concept.

What is claimed is:

1. Selectively adjustable multi-beam electronic photographic flash having
    a single elongated flashtube (2);
    and a reflector assembly (4, 5, 6) partially surrounding the flashtube and including a plurality of reflector elements of which at least one reflector element is pivotable with respect to another reflector element about an axis parallel to the elongated flashtube, to selectively direct light flashes from the tube to selective directions,
    wherein, in accordance with the invention, the reflector elements have a curvature which lies in the area (R) between curves defined by equations A and B herein:

$$A: y^2 = 13,4 \times -0,3722\, x^2 \text{ with } 0 < y < 12,3 \text{ and}$$
$$B: y^2 = 18 \times -0,5233\, x^2 \text{ with } 0 < y < 11$$

and wherein the curvature of the reflector elements, at values of y at the lower end of the range is close to the curve defined by equation B, and said curvature of the reflector element varies smoothly within said area (R) to approach the curve defined by equation A as the value of y increases towards the upper end of its range.

2. Flashgun according to claim 1, wherein the curvature of the reflector element is composed of three curve sections I, II, III, said sections merging into each other, and being defined as follows:

| Curve Section | Range | Equation |
| --- | --- | --- |
| I | $0 < y < 4$ | $y^2 = 15.4 \times -0.0675\, x^2$ |
| II | $4 < y < 9$ | $y^2 = 14.6 \times -0.4148\, x^2$ |
| III | $9 < y < 12.06$ | $y^2 = 12.6 \times -0.2681\, x^2$ |

3. Flashgun according to claim 1, further including a housing;
    wherein two reflector elements are provided, one element being fixed in the housing and the other element being movable with respect to said first element.

4. Flashgun according to claim 1, wherein three reflector elements are provided, longitudinally arranged along the elongated flashtube;
    and wherein the center reflector element is fixed and the two lateral reflector elements are movable with respect to the center reflector element.

5. Flashgun according to claim 4, wherein the two lateral reflector elements are ganged together to move conjointly.

6. Flashgun according to claim 4, wherein the lateral reflector elements have outer side walls which are inclined with respect to the axis of the elongated flashtube.

7. Flashgun according to claim 6, wherein the ratio of the width (b) of the center reflector element to the sum of the widths (2a) of the lateral reflector elements at the apex of the reflector elements is about 1:3.

8. Flashgun according to claim 4, wherein the ratio of the width (b) of the center reflector element to the sum of the widths (2b) of the lateral reflector elements at the plane of the light exit opening is about 1:4.4.

9. Flashgun according to claim 8, wherein the ratio of the width (b) of the center reflector element to the sum of the widths (2a) of the lateral reflector elements at the apex of the reflector elements is about 1:3.

10. Flashgun according to claim 9, wherein three reflector elements are provided, longitudinally arranged along the elongated flashtube.
    wherein the center reflector element is fixed and the two lateral reflector elements are movable with respect to the center reflector element;
    and wherein the curvature of the reflector element is composed of three curve sections I, II, III, said sections merging into each other, and being defined as follows:

| Curve Section | Range | Equation |
| --- | --- | --- |
| I | $0 < y < 4$ | $y^2 = 15.4 \times -0.0675\, x^2$ |
| II | $4 < y < 9$ | $y^2 = 14.6 \times -0.4148\, x^2$ |
| III | $9 < y < 12.06$ | $y^2 = 12.6 \times -0.2681\, x^2$ |

* * * * *